(12) United States Patent
Noone et al.

(10) Patent No.: US 7,382,797 B2
(45) Date of Patent: Jun. 3, 2008

(54) MECHANISM TO SELECT THE PHYSICAL MEDIA TYPE CONNECTOR IN NETWORK DEVICES

(75) Inventors: Jyothi Prakash Noone, Fremont, CA (US); George C. Yu, Cupertino, CA (US); Zhonghua Chen, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 628 days.

(21) Appl. No.: 11/009,257

(22) Filed: Dec. 9, 2004

(65) Prior Publication Data

US 2006/0126655 A1  Jun. 15, 2006

(51) Int. Cl.
*H04J 3/16* (2006.01)
*H04M 1/00* (2006.01)
*H04L 1/00* (2006.01)

(52) U.S. Cl. .................. 370/437; 370/445; 370/463; 379/399.01; 340/825.19

(58) Field of Classification Search ........ 370/242–248, 370/419–421, 437, 445, 463, 465, 522, 524; 379/399.01, 441–443; 340/825, 825.06, 340/825.16, 825.17, 825.01, 825.19
See application file for complete search history.

(56) References Cited

U.S. PATENT DOCUMENTS

2001/0009553 A1* 7/2001 Homann .................. 370/445

* cited by examiner

*Primary Examiner*—Afsar M. Qureshi
(74) *Attorney, Agent, or Firm*—Sierra Patent Group, Ltd.

(57) ABSTRACT

A network device comprises first and second transceivers configured to aid communication between a plurality of networked devices; first and second communication medium connections in communication with the first and second transceivers, and capable of receiving first and second communication media, respectively; and a sliding door, said sliding door retained between an upper sliding track and a lower sliding track such that said sliding door covers one of said first and second connection while exposing the other of said first and second connection.

6 Claims, 1 Drawing Sheet

MECHANISM TO SELECT THE PHYSICAL MEDIA TYPE CONNECTOR IN NETWORK DEVICES

FIELD

The present invention relates broadly to media connections used in network devices. Specifically, the present invention relates to a mechanism that selects a media connection from a plurality of media connections present on a network device.

BACKGROUND

Network devices, such as routers and Ethernet switch products, provide network interfaces that support different physical media types. For example, a gigabit Ethernet interface can support multiple media types such as copper cables and fiber optic cables. In current network devices, the media type for a gigabit Ethernet interface can be selected by choosing different transceivers supporting different cable connectors such as GBIC or SFP modules.

Currently, a user needs to purchase a media plugin module depending on the type of cable or fiber media the user wishes to use with the network device. If the user subsequently needs to upgrade the network device to a different media type, the purchase of an additional plugin module may be required. In existing network device designs, typically only one type of media is supported at a time. Thus, MAC layer circuitry and media-dependent PHY circuitry are separated.

Network devices can be improved by including two or more transceivers that can be connected simultaneously. Each transceiver is dedicated to a specific media type, such as one transceiver being included for copper cable, another transceiver for fiber optic cable, etc. Such a design provides user flexibility with a relatively low cost and small footprint. Because multiple connectors are presented to the user but the interface can only support one media type at a time, only one cable should be connected with the selected media transceiver. However, a network device presenting multiple connections is likely to cause confusion for the user and require additional configuration to select the proper media type.

SUMMARY

The present invention solves the problems described above by providing a networking device having a sliding selector that exposes only one connection at a time from a plurality of media connection types. In one embodiment, the present invention provides a networking device that includes an Ethernet connector and a fiber optic cable connector, with a transceiver dedicated to the Ethernet connection and a transceiver dedicated to the fiber optic connection. The connectors are disposed next to each other, and receive plugs attached to a copper cable, in the case of the Ethernet connection, or fiber optic cable. In an embodiment, a sliding door is disposed in proximity to the connectors on the networking device such that the door always covers either the Ethernet connector or the fiber optic connector, but can be moved to cover one of the connections while exposing the other connection. In an embodiment, the sliding door rests between an upper rail and a lower door, wherein the upper rail and the lower rail together form a track that guides the movement of the sliding door. The upper and lower rails are sufficiently dimensioned to maintain the sliding door at a distance necessary to provide clearance for the sliding door to move in front of the connections on the network router without coming into contact with any protruding structure associated with the connections, if any are present.

Other features and advantages of the present invention will be realized by one skilled in the art upon reading the following detailed description, when considered in conjunction with the accompanying illustrations.

DETAILED DESCRIPTION OF THE DRAWINGS

Figure 1:
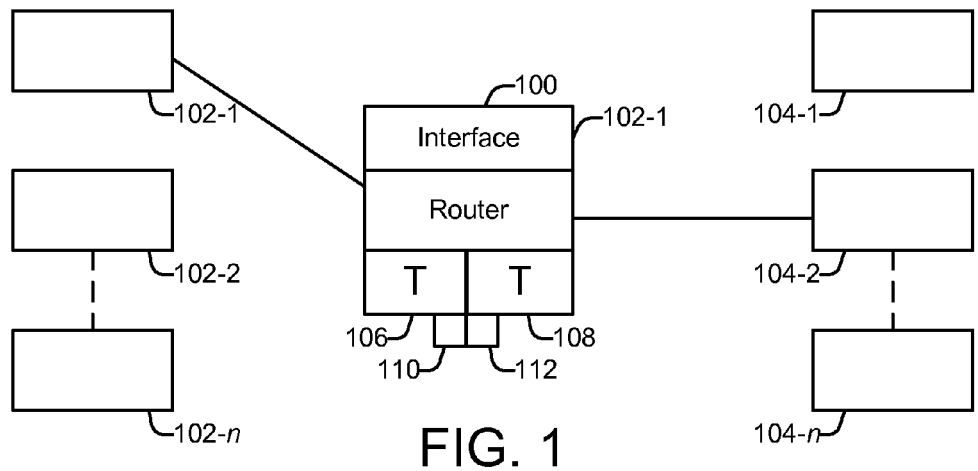
FIG. 1 illustrates in block diagram form a networking device for use in computer networking applications.

Directing attention to FIG. 1, networking device 100 is used in networking applications where networking device 100 is in communication with a plurality of devices, including devices 102, 104. Networking device 100, depending on embodiment, may be a networking switch, communication router, or other network device that includes multiple media-type connection ports. Device 102 utilizes networking device 100 to provide a communication connection with device 104. In an embodiment, networking device 100 is a mobile router that can be quickly moved and configured to operate in different physical locations, as needed. Networking device 100 can include transceivers 106, 108 that support different media types. For example, transceiver 106 can be configured to support connection 110 and communicate over a medium, such as copper wire or cable, and transceiver 108 can be configured to support connection 112 and communicate over a different medium, such as a fiber optic medium. In another embodiment, connections 110 and 112 can support the same type of medium. For example, transceivers 106, 108 can be individually configured to accommodate different protocols over similar communication media. Transceivers 106, 108 are also in communication with interface 109, which allows a user to configure networking device 100 to utilize one of transceivers 106, 108.

Figures 2A, 2B:
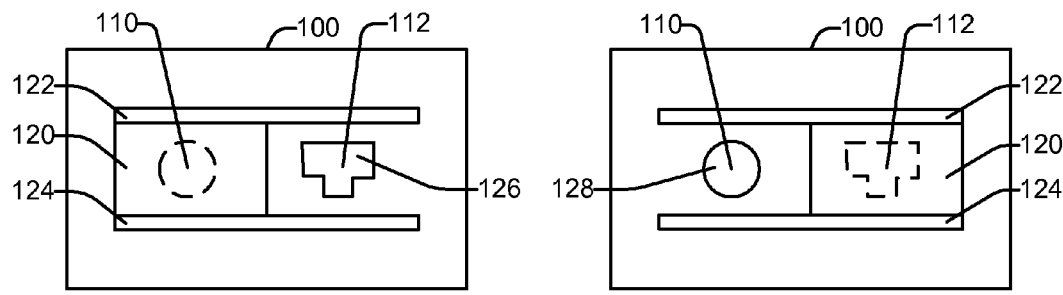
FIGS. 2A and 2B illustrate media connections on the networking device having a sliding mechanical door that covers one of the media connections while exposing another one of the media connections.

Directing attention to FIGS. 2A and 2B, connections 110, 112 are located in close proximity to each other on the outside of networking device 100. As illustrated, sliding door 120 is retained between upper sliding track 122 and lower track 124. Sliding door 120 can be positioned in front of connection 110, as shown in FIG. 2A, to allow access to connection 112, so that medium 126 can be plugged into connection 112. When sliding door 120 is positioned as shown in FIG. 2A, sliding door prevents access to connection 110. Alternatively, as shown in FIG. 2B, when sliding door is positioned in front of connection 112, medium 128 can be plugged into connection 110, while access to connection 112 is prevented. In this manner, only one connection is exposed at one time. This allows manufacturers of networking device 100 to preconfigure networking device 100 to utilize a particular transceiver, and aiding installation of networking device 100 by a user by eliminating confusion over which connection to choose.

Figure 3:
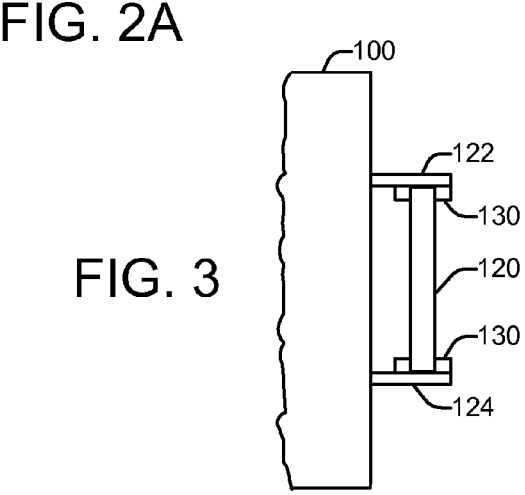
FIG. 3 illustrates upper and lower tracks that guide the travel of a sliding door retained between the upper and lower tracks.

Directing attention to FIG. 3, in an embodiment, upper sliding track 122 and lower track 124 are formed with channel 130 that retains sliding door 120 at a desired distance away from connections 110, 112, and guide the movement of sliding door 120 along tracks 122, 124.

While a method and apparatus for selecting the physical media type connector on network devices has been described and illustrated in detail, it is to be understood that many modifications can be made to various embodiments of the present invention, without departing from the spirit thereof.

What is claimed is:

1. A networking device, comprising:
   a first transceiver and a second transceiver, said first and second transceivers configured to aid communication between a plurality of networked devices;
   a first communication medium connection, said first connection in communication with said first transceiver, said first connection capable of receiving a first medium;
   a second communication medium connection, said second connection in communication with said second transceiver, said second connection capable of receiving a second medium;
   an interface, said interface capable of selecting between said first and second transceivers for use by said networking device to facilitate communication between devices of said plurality of networked devices; and
   a sliding door, said sliding door retained between an upper sliding track and a lower sliding track such that said sliding door covers one of said first and second connection while exposing the other of said first and second connection.

2. The networking device of claim 1, wherein said first connection accommodates an Ethernet-compliant communication medium.

3. The networking device of claim 1, wherein said second connection accommodates a fiber optic communication medium.

4. The networking device of claim 1, wherein said first and second communication medium connections accommodate similar communication media.

5. The networking device of claim 1, wherein the networking device comprises a communication router.

6. The network device of claim 1, wherein the networking device comprises a networking switch.

* * * * *